(12) United States Patent  
Alberti

(10) Patent No.: US 8,128,163 B2
(45) Date of Patent: Mar. 6, 2012

(54) BAGGAGE STORAGE DEVICE FOR A PUBLIC TRANSPORT VEHICLE

(75) Inventor: Jerome Alberti, Toulouse (FR)

(73) Assignee: Airbus, Blagnac (FR)

( * ) Notice: Subject to any disclaimer, the term of this patent is extended or adjusted under 35 U.S.C. 154(b) by 300 days.

(21) Appl. No.: 12/521,870

(22) PCT Filed: Dec. 27, 2007

(86) PCT No.: PCT/FR2007/002175
§ 371 (c)(1),
(2), (4) Date: Jul. 1, 2009

(87) PCT Pub. No.: WO2008/102078
PCT Pub. Date: Aug. 28, 2008

(65) Prior Publication Data
US 2010/0045082 A1 Feb. 25, 2010

(30) Foreign Application Priority Data
Jan. 2, 2007 (FR) .................................. 07 00006

(51) Int. Cl.
*B60N 3/00* (2006.01)
(52) U.S. Cl. .................................. 297/188.08; 296/37.15
(58) Field of Classification Search ............. 297/188.08, 297/188.1, 188.12; 296/37.15
See application file for complete search history.

(56) References Cited

U.S. PATENT DOCUMENTS

| 993,633 | A | * | 5/1911 | Ambrock | 211/31 |
| 1,832,642 | A | * | 11/1931 | Leff | 297/188.1 |
| 2,748,841 | A | * | 6/1956 | Rimkus | 297/188.12 |
| 3,160,438 | A | * | 12/1964 | Davis | 297/188.12 |
| 3,584,915 | A | * | 6/1971 | Meyers, Jr. | 297/188.12 |
| 5,816,650 | A | * | 10/1998 | Lucas, Jr. | 297/188.1 |
| 6,419,313 | B1 | * | 7/2002 | Newman | 297/188.1 |
| 6,546,598 | B1 | * | 4/2003 | Nakanou et al. | 224/281 |
| 7,517,014 | B2 | * | 4/2009 | Schroeder et al. | 297/188.09 |
| 7,530,631 | B2 | * | 5/2009 | Skelly et al. | 297/188.08 |
| 2003/0222174 | A1 | | 12/2003 | Saint-Jalmes | |

FOREIGN PATENT DOCUMENTS

DE 20 2004 008 069 9/2004
EP 1 366 988 12/2003

* cited by examiner

Primary Examiner — Peter R. Brown
(74) Attorney, Agent, or Firm — Oblon, Spivak, McClelland, Maier & Neustadt, L.L.P.

(57) ABSTRACT

A device for storing luggage for a public transport vehicle, that includes a base defining a reference surface, a first bearing surface, and a second bearing surface, each of the bearing surfaces being essentially planar and inclined relative to the reference surface, and both bearing surfaces converging towards the reference surface and defining a storage volume capable of receiving a piece of luggage.

16 Claims, 2 Drawing Sheets

BAGGAGE STORAGE DEVICE FOR A PUBLIC TRANSPORT VEHICLE

Figure 1:
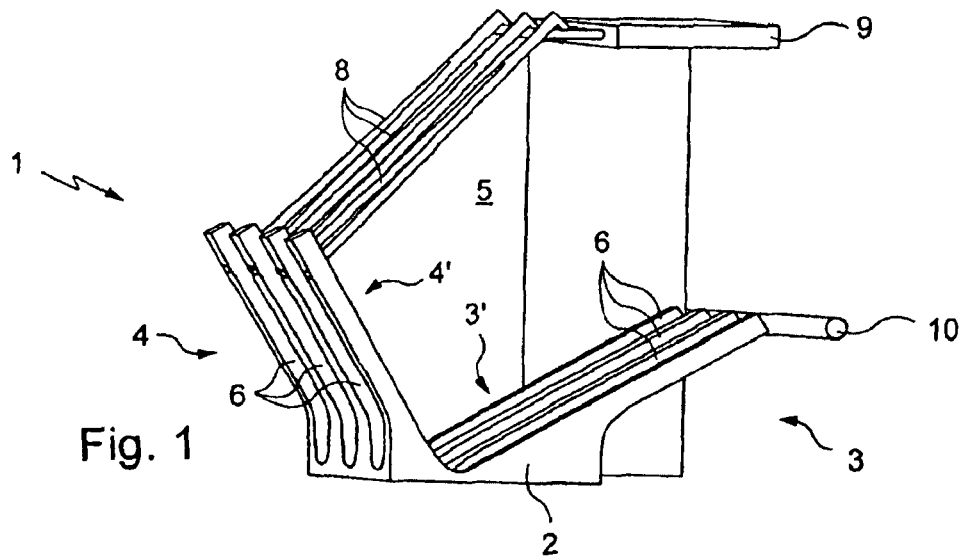

This invention relates to a baggage storage device for a public transport vehicle, for example an aircraft.

In an aircraft, the hand baggage accompanying the travelers usually is placed in a baggage bin arranged overhead above the seats.

This device has several drawbacks.

Considering the general shape of an aircraft cabin, the section of which generally has the shape of an arc of a circle, little free space remains above the heads of the seated passengers. The latter, upon standing up, must be careful not to bump the head against the baggage bin. In order to proceed from the longitudinal aisle of the airplane to their seat, or from their seat to the longitudinal aisle, the passengers must bend down, which is uncomfortable for them, and leads to delays in the process of boarding and deplaning of the passengers.

Furthermore, access to the seats is very awkward for individuals with reduced mobility who are unable to bend down easily.

Moreover, the positioning of the baggage bins close to the ceiling, with an opening of the bins toward the aisle, compels the passengers to remain in the aisle in order to accomplish loading of the baggage into these bins, which prevents the other passengers from proceeding along the longitudinal aisle. The boarding process therefore is slowed down. The same is true with the deplaning process. In order to solve this problem, the aisles of airplanes sometimes are inordinately large so as to allow two passengers to pass, but that brings about a loss of space to the detriment of the space devoted to the seats for the passengers.

Moreover, the presence of baggage bins gives the interior space of the cabin a closed-in appearance, which is unpleasant for the passengers in seated position for the duration of the trip.

Likewise, the known seats have a low sitting surface, which compels the passengers to travel with their knees flexed, which is uncomfortable.

Moreover, with the known baggage bins, the passengers do not have an individualized space for storage of baggage, which causes travelers to mistake their baggage for that of another traveler.

Moreover, the structure of the baggage bins fastened to the ceiling is heavy, because of the safety constraints specific to aircraft, and is responsible for a considerable portion of the total weight of the airplane, which increases its fuel consumption and limits its range.

There is known through document EP 1 366 988 A1, a baggage bin able to be arranged under a seat the sitting surface of which can be folded over against the back, the bin comprising a compartment of general parallelepipedal shape. The compartment comprises an aperture, and is movable between a horizontal position in which the aperture is facing a wall of the compartment and a sloping position in which the aperture of the compartment is facing the location of the sitting surface of the seat, thus clearing a way for access to the compartment.

Such a bin offers only a limited flexibility for the positioning of baggage. It imposes constraints of size and shape on the baggage, because of the enclosed nature of the compartment. Large bags cannot fit in the compartment, and small bags will not be stabilized in the compartment, thus running the risk of untimely shifting during maneuvers of the airplane, which it is preferable to avoid.

Moreover, such a bin is complex to construct, and therefore can prove to be easily damaged, in particular because of the movable nature of the compartment of the bin.

Moreover, such a bin has a relatively substantial weight.

There also is known, through patent document EP 1 647 483 A1, a baggage bin of general triangular shape on the outside, able to be arranged under a seat the sitting surface of which can be folded over against the back, and comprising a bottom surface. The outer triangular shape of the baggage bin and the small space available in the bin offer little flexibility in the loading of baggage. Only small bags meeting specific geometric constraints can be loaded into the bin. Moreover, such a baggage bin is quite heavy.

This invention has as its purpose to provide a new baggage storage device for a vehicle for transport of passengers, for example for an aircraft, making it possible to free up the space above the seated passengers, and to overcome the various drawbacks described above, in particular by offering a greater flexibility for storage in the baggage storage device. Preferably, the solution according to the invention will have a minimum weight.

In order to solve the various problems mentioned above, this invention proposes a baggage storage device for a public transport vehicle, characterized in that the said device comprises a base defining a reference surface, a first support surface, a second support surface, each of the said support surfaces being more or less flat and sloping in relation to the said reference surface, the two support surfaces converging toward the said reference surface and defining a storage space able to hold a bag.

This device has the following advantages:
the device can be placed on the floor of the passenger cabin, by virtue of the base,
one or more bags having an angle, for example a right angle, can be placed on the support surfaces, in the storage space in the angle which they form, the angle of the bag coming to be positioned in the angle of the two surfaces, the latter sustaining and stabilizing the bag.

Preferentially, the two support surfaces (3', 4') form an angle ranging between 75° and 135°.

That makes it possible to position a bag having a right angle while best filling the space delimited by the two surfaces,
the angle that the support surfaces form provides an additional space outside the storage device
the weight of the device is slight
the device is sturdy because it is simple, and maintenance costs are low
the space occupied by the device is small.

Preferentially, the angle between the two support surfaces is close to 90°, for example ranging between 85° and 95°. That allows a good fit of this angle with most of the bags and therefore a better utilization of the storage space.

Preferentially, the baggage storage device furthermore comprises a recess, the said recess forming at least one aperture in one of the support surfaces.

That makes it possible to arrange a bag or bags in the baggage storage device by arranging a part of the bag or bags outside the space delimited by the two support surfaces, in the recess of the device. That also makes it possible to position a bag or bags in a plurality of orientations, so as best to fill the space in the device and in the surroundings of the device, irrespective of the size and geometry of the bags. In particular, a bag can be positioned in the recess in such manner that an elongated dimension of this bag is parallel to the direction of the recess.

Preferentially, the said recess comprises a bottom extended along a direction crosswise to the intersection of the two support surfaces, and the said recess extends the opposite way from the bottom so that in each support surface it forms an aperture opening into the free edge of the corresponding support surface opposite the intersection of the two support surfaces.

That makes it possible to place a bag vertically in the recess and to best use the storage space. That also makes it possible to insert bags of considerable size.

In an advantageous embodiment, each aperture has an overall U shape with a bottom and two branches; the width of each aperture corresponding to the distance between the two branches increases from a minimum value near the bottom to a maximum value toward the mouth of the aperture.

Preferentially the aperture comprises at least one boss forming a notch for following the shape of the bags.

Preferentially, the branches each comprise at least one boss forming a notch, two bosses facing one another forming a support in the aperture. In this way the shape of the recess is adjusted to bags of various dimensions, by virtue of the support formed by the bosses that allow the holding of these bags in the aperture, while best using the available space.

Preferentially, the baggage storage device according to the invention comprises a retaining means for at least one bag positioned in the storage space. These means comprise, for example, a strap, for example an elastic strap.

Retaining means make it possible to minimize the movement of bags in the recess, and also to prevent a garment or a book from sliding on the bag. Such a strap is a means easy to install, lightweight, and then easy to manipulate for the passenger. It also is adaptable to bags of variable sizes, and makes it possible to ensure holding thereof in a more secure manner.

Preferentially, the device furthermore comprises a bracket positioned in such manner that it allows fastening of the strap after insertion of at least one bag into the storage space.

Preferentially, the retaining means comprise a bar that also can serve as a footrest for a seated passenger.

Preferentially, the baggage storage device comprises a plurality of similar recesses arranged, for example evenly, in accordance with the direction of intersection of the support surfaces. The same storage device then can accommodate the baggage of various passengers.

Preferentially, the base defining a reference surface is a flat base.

Moreover, the slope of the device frees up a space that, according to one preferred embodiment, can be used as a comfort area so that a passenger can prop up his feet under his seat, or so that a passenger can prop up his feet under the seat of the passenger in front of him. Preferentially, the device therefore comprises at least one comfort area between the said reference surface and at least one of the support surfaces, the opposite way from the storage space facing the latter, this comfort area allowing at least one passenger to place his feet there.

Preferentially, the two support surfaces are sufficiently long crosswise to the intersection of the support surfaces to hold back the bags in the event of sudden deceleration of the vehicle.

Preferentially, the vehicle is an aircraft.

This invention also relates to a seat for a public transport vehicle, the said seat comprising a sitting surface, equipped with a baggage storage device according to the invention, the said device being arranged underneath the said sitting surface.

Such a seat has the advantage that a passenger can insert his bag or bags into the baggage support device while standing close to the seat, and that he then can sit down on the seat, which makes it possible to save time in the boarding phase.

That also has the advantage that the passenger can remove the bag or bags in the same manner, which makes it possible to save time in the deplaning phase.

That also makes it possible to raise the sitting surface of the seat in comparison with the known seats, the space freed up under the seat being used for the storage of baggage, and the knees of the passenger being less flexed than with the known seats, that allowing the passengers to be seated more comfortably. That also makes it possible to enhance the comfort connected with the tilting of the seat.

According to a preferred embodiment variant, the said seat for an aircraft comprises a sitting surface and a back; the storage device is arranged underneath the sitting surface of the seat, and the sitting surface of the seat is movable between two positions, a first position referred to as folded over making it possible for a passenger to sit down on the seat, and a second position referred to as raised providing a greater access to the device for the insertion of one or more bags therein.

In this way a passenger can insert his bag or bags into the baggage support device while standing close to the seat, the sitting surface being raised, and he then can sit down on the seat, the sitting surface being folded over, which makes it possible to save time in the boarding phase.

That also has the advantage that the passenger can remove the bag or bags in the same manner, which makes it possible to save time in the deplaning phase.

This invention also relates to a set of seats aligned, for example, side by side, comprising at least two seats for a public transport vehicle such as described above, the baggage storage device being common to the various seats of the set.

This invention also relates to an aircraft comprising a baggage storage device such as described above.

Such an aircraft also has the advantage of making it possible to avoid having to place baggage bins at the ceiling of the cabin.

Figure 2:
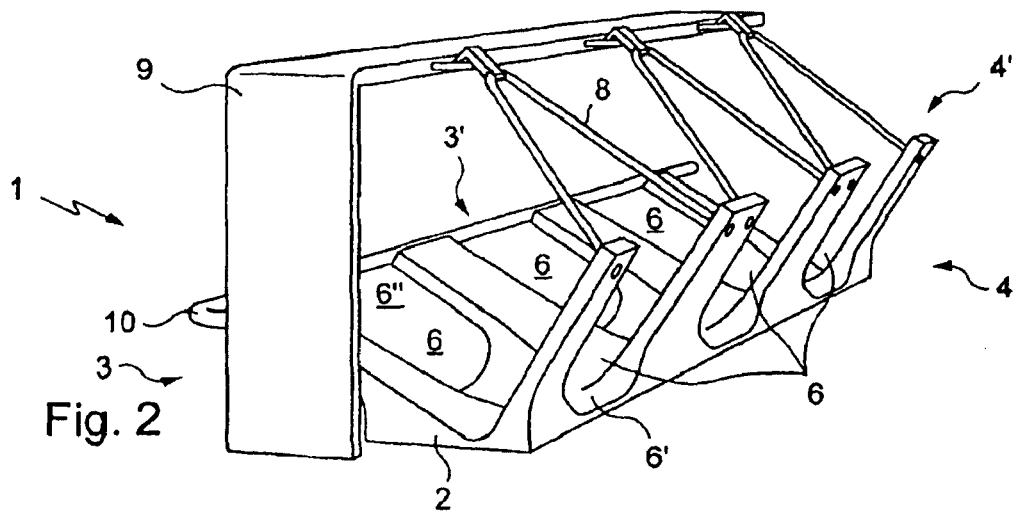
Figure 3:
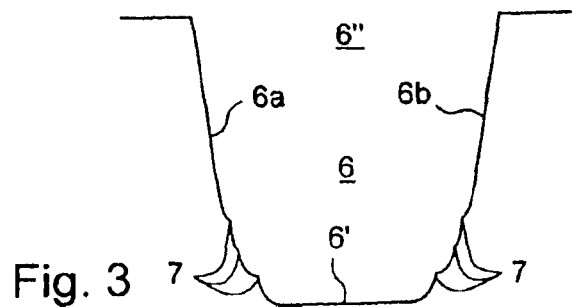
Figure 4:
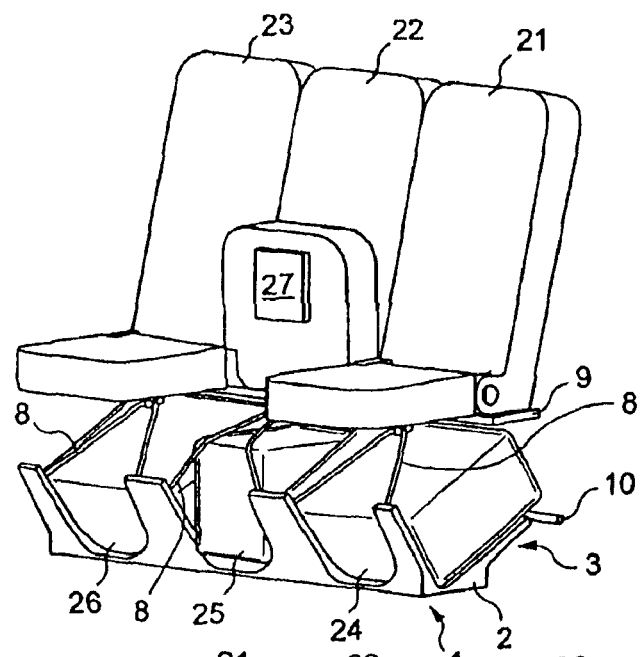
Figure 5:
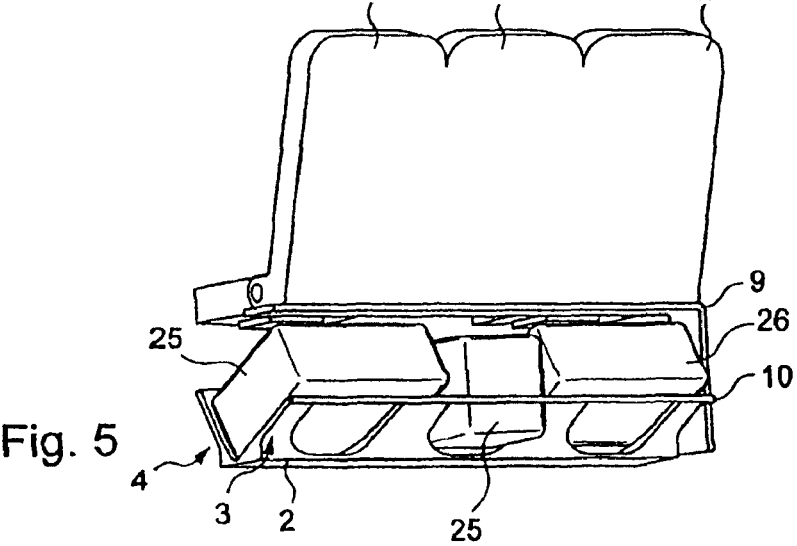
Figure 6:
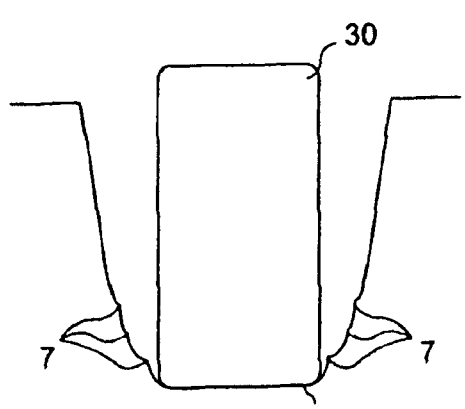
Figure 7:
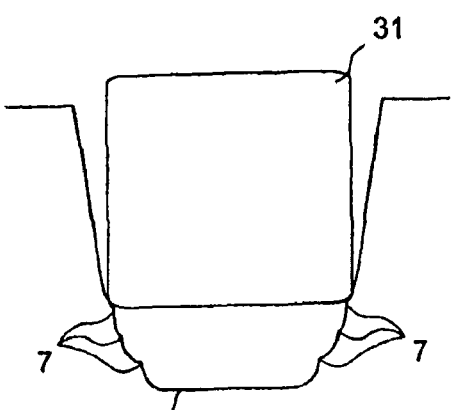

Other characteristics and advantages of the invention will become apparent in the light of the detailed description below and of the drawings in which:

FIG. 1 is a perspective view of a baggage storage device according to the invention, FIG. 2 is a view of the same device from another angle, FIG. 3 is a diagram of an aperture of a wing of the baggage storage device according to the invention, FIG. 4 is a perspective view of a set of three seats for aircraft passengers comprising a baggage storage device according to the invention, three bags being arranged in the storage device, FIG. 5 is a perspective view of the rear of the same set of three seats for aircraft passengers comprising a baggage storage device, FIGS. 6 and 7 correspond to the diagram of FIG. 3 and show bags of various widths positioned in the aperture.

FIGS. 1 and 2 show a device 1 for storage of baggage according to the invention. In this embodiment, this storage device is a shaped piece comprising a flat rectangular base 2 placed on a floor, a first wing 3, and a second wing 4. The two wings 3, 4 possess a depth and each comprises an upper face forming a support surface 3', 4' intended for support of baggage.

In the remainder of the description, it will be considered that a longitudinal direction is indicated by the longitudinal axis of the shaped piece.

The two baggage support surfaces 3', 4' are cut along a straight longitudinal intersection line (not shown), the angle between the two surfaces being laid out with a connecting neck molding. The two support surfaces 3', 4' delimit a storage space 5 able to accommodate one or more bags. The interior of the angle between the two support surfaces 3', 4' is rounded according to a connecting neck molding.

The length of device 1 in the longitudinal direction is determined according to the purpose of the device. For the embodiment shown, device 1 is intended to be installed under a row of three seats of an aircraft passenger cabin. Its length along the longitudinal direction therefore is adapted accordingly.

In the embodiment shown, support surface 3' is inclined at approximately 30° in relation to the horizontal and support surface 4' is inclined at approximately 60° in relation to the horizontal. The two surfaces 3' and 4' are inclined at approximately 90° in relation to one another.

With reference to FIGS. 1, 2 and 3, device 1 comprises recesses extended along a direction crosswise and parallel to flat base 2. These recesses are distributed evenly along the longitudinal direction. They traverse wing 3 and open into storage space 5 through support surface 3'. They also traverse wing 4, and open into storage space 5 through support surface 4'.

In the embodiment shown, the number of these recesses is three, that is, identical to the number of corresponding seats. The recesses are identical. Moreover, these recesses traverse device 1 right through along the crosswise direction, thus opening out on both sides of the device through apertures 6.

Apertures 6 have an overall U shape (FIG. 3), comprising side branches 6a, 6b, and a bottom 6'. Each aperture 6 opens out from its bottom 6' toward the free edge of the wing forming a mouth 6" thereon. Each aperture 6 borne by a wing 3 is aligned with an aperture 6 borne by a wing 4 along the crosswise recess direction. Finally, in the embodiment shown, apertures 6 possess a plane of symmetry perpendicular to the longitudinal direction. Also, the bottom 6' of each aperture 6 is tangent to the connecting neck molding of the intersection of the two support surfaces 3', 4'.

Side edge 6a bears bosses 7 forming notches (three in number on FIG. 3, not shown on FIGS. 1 and 2 for the sake of readability). Side edge 6b also bears bosses 7 symmetrical with the preceding bosses in relation to the plane of symmetry of the recess, and each pair of symmetrical bosses forms a platform at a given height between the bottom 6' of the aperture and its mouth 6". Bosses 7 are made of a flexible material (here rubber), so as to follow the shape of the bags.

Wing 4 of support device 1 comprises two fastening points on both sides of mouth 6" of each aperture 6 on wing 4. A mobile retaining means is fastened to the device by these two fastening points. The retaining means here is a strap 8 that is fastened by its two ends to the two fastening points. It makes it possible to partially close up storage space 5 above wing 4.

A bracket 9 is arranged above baggage support device 1, more precisely above wing 3. This bracket, which serves mainly as support for aircraft seats, bears three rings facing wing 4, each ring being centered in relation to mouth 6" of an aperture 6. A hook is fastened to the middle of each strap 8 and cooperates with the corresponding ring so that strap 8 takes on a V-shaped arrangement between mouth 6" on wing 4 and the corresponding hook, the hook taking the place of the point of the V.

A bar 10 is fastened to wing 3 of baggage support device 1, the opposite way from flat base 2, near mouths 6" of apertures 6. This bar 10 is adapted to serve as a footrest. It is positioned more or less parallel to the flat base, across mouths 6", across apertures 6 and thus forms a fixed retaining means for the bags arranged in the recesses of the baggage support device.

Device 1 furthermore comprises an empty space between the extension of flat base 2 and wing 3, of sufficient size for accommodating the feet of a passenger.

With reference to FIGS. 4, 5, 6 and 7, baggage storage device 1 according to the invention is placed on the floor and under a row of three seats 21, 22, 23. Each seat comprises a back and a sitting surface that are fastened onto bracket 9, each seat being above a recess. The backs of the seats are positioned above wing 3, that is, the wing closest to the horizontal.

Three bags with rectangular parallelepipedal shape 24, 25 and 26 are arranged in the baggage support device. Each bag is arranged under the sitting surface of a seat 21, 22, 23. Bags 24 and 26 are arranged down flat in storage space 5, that is, so that one of their angles is placed in the angle of baggage support surfaces 3', 4', the largest faces of each of these bags being positioned parallel to baggage support surface 3'.

Bag 25 is arranged vertically both in storage space 5 and in a recess. Its largest faces are positioned perpendicular to the longitudinal direction. In the crosswise direction of the recess, on the side of aperture 6 on wing 3, bag 25 abuts against bar 10. Still in the direction of the recess, on the side of aperture 6 of the recess on wing 4, bag 25 is retained by a strap 8.

In order to undertake loading or unloading, the user, for example the passenger, unhooks strap 8 from bracket 9 so as to open an access way to storage space 5. Advantageously, at the time of unloading or unloading of bags, the seating surface of a seat 21, 22, 23 also can be swung against the corresponding back, so as to enlarge the access way to storage space 5. On FIG. 4, the sitting surface of seat 22 thus is shown in raised position and the sitting surfaces of seats 21 and 23 are shown in down position. For each seat 21, 22, 23, a mechanism (not shown) makes it possible to hold the sitting surfaces in raised position in the absence of the weight of a passenger seated on the sitting surface.

With reference to FIGS. 6 and 7, the platforms formed by bosses 7 borne by side walls 6a, 6b of apertures 6 make it possible to stabilize bags of various widths when they are arranged vertically in a recess. On FIG. 6, a bag 30 of small width is positioned in device 1 and is supported vertically on bottom 6' of an aperture 6, being stabilized laterally by a pair of bosses 7. On FIG. 7, a bag 31 of large width is positioned in device 1 and is supported vertically on the platform formed by a pair of bosses 7. The flexible nature of bosses 7 enables them to follow the shape of the bags and to hold them in place effectively.

Moreover, in the embodiment shown, a life vest 27 is positioned under the sitting surface of each seat.

The row of three seats 21, 22, 23 is arranged in the cabin of an airplane not comprising baggage storage at the ceiling, or comprising an empty space above the seats, able to allow a passenger to move about standing upright in front of the seats parallel to the said row of seats.

The device described makes it possible to store bags, of varied dimensions and shapes, to ensure that these bags are supported, while best utilizing the available space, and minimizing the weight of the device. Its ease of use and its location in the cabin make it possible to speed up the process of boarding or deplaning.

That enables the passengers to access their seat proceeding from a longitudinal aisle of the cabin or to access the aisle proceeding from their seat while standing upright and without having to bend the head or the back, which makes it possible, in comparison with an airplane cabin comprising standard seats and baggage compartments arranged at the ceiling, to save time during the boarding phase and during the deplaning phase and to enhance the comfort of the passengers. Moreover, that is very useful for creating easier accesses for passengers handicapped by reduced mobility.

That also makes it possible to reduce the width of the aisle in comparison with cabins of the prior art, the passengers not needing to spend time in the aisle during the boarding and deplaning phases in order to insert their bags into the baggage bins arranged under the ceiling of the cabin.

Such an aircraft is lighter in weight than aircraft comprising baggage bins under the ceiling, and therefore consumes less fuel, and therefore has a greater range. It has a greater capacity for baggage storage.

That also makes it possible to provide each passenger with an individualized baggage storage space, which enables the passengers not to mistake their bags for those of other passengers.

Finally, the passenger seated on a seat 21, 22, 23 benefits from the comfort area between wing 4 and the floor, where he can place his feet. Also, a passenger seated on a seat (not shown) positioned behind a seat 21, 22 or 23 benefits from the comfort area between wing 3 and the floor, where he can place his feet.

This invention is not limited to the embodiment described above and shown in the drawing. It also relates to all the embodiment variants within the capacity of the individual skilled in the art.

In particular, it is possible for the storage device not to comprise any recess. It also is possible to have a recess forming an aperture, opening out or not, in a single wing of the device. This recess, if it is implemented, also can form an aperture not opening out in each of the support surfaces described.

The above description shows an embodiment in which the storage device is produced from a single piece starting from a more or less V-shaped section. Such a device, adopting the same shape or a different shape, also could be produced with several components.

Moreover, the bosses described above can have various shapes, and resemble lugs, for example. They can be made of various materials, for example foam rubber.

Other retaining systems can be considered for retaining bags, such as, for example, a cover or a shutter.

Moreover, the flat base can be replaced by a fastening rail or by any other fastening means.

Thus, the device described is intended to be installed under three seats, but it can be installed under any number of seats.

Finally, the device according to the invention can be used in a public transport vehicle other than an aircraft, for example a train or a bus.

The invention claimed is:

1. A seat for a public transport vehicle, the seat comprising:
a sitting surface,
a baggage storage device arranged on a floor underneath the sitting surface, the baggage storage device comprising:
a base arranged on the floor and defining a reference surface,
a first support surface connected to the base and sloping at a first predetermined angle with respect to the reference surface,
a second support surface connected to the base and sloping at a second predetermined angle with respect to the reference surface, the second support surface meeting the first support surface at the base,
wherein the first and second support surfaces form an angle therebetween to define a storage space configured to hold a bag.

2. A seat for a public transport vehicle according to claim 1, wherein the first and second support surfaces form an angle ranging between 75° and 135°.

3. A seat for a public transport vehicle according to claim 1, further comprising at least one aperture in one of the first and second support surfaces.

4. A seat for a public transport vehicle according to claim 3, wherein the at least one aperture provides access to a storage space through at least one of the first support surface and the second support surface.

5. A seat for a public transport vehicle according to claim 3, wherein the storage space comprises a bottom extended along a direction crosswise to an intersection of the first and second support surfaces, and the storage space extends in a direction opposite from a longest dimension of the bottom, and the aperture comprising at least one boss forming a notch to follow a shape of the bag.

6. A seat for a public transport vehicle according to claim 1, further comprising at least one comfort area formed by a void between the reference surface and at least one of the first and second support surfaces, the comfort area receiving feet of at least one passenger.

7. A seat for a public transport vehicle according to claim 1, wherein a distance on each of the first and second support surfaces measured from a point further from the base to a point closest to the base is configured to cause each of the first and second support surfaces to hold back bags placed in the baggage storage device during sudden deceleration of the vehicle.

8. A seat for a public transport vehicle according to claim 1, wherein the public transport vehicle is an aircraft.

9. A seat for a public transport vehicle according to claim 1, wherein the sitting surface of the seat is movable between a first position allowing a passenger to sit down on the seat, and a second position providing a access to the baggage storage device for insertion of one or more bags therein.

10. An aircraft, comprising a seat according to claim 1.

11. The seat according to claim 1, further comprising:
a bracket arranged over the baggage storage device to support the sitting surface.

12. The seat according to claim 11, wherein one of the first and second support surfaces includes a plurality of straps affixed to an edge furthest from the base, the straps attaching to the bracket to support bags stored in the baggage storage device.

13. The seat according to claim 12, wherein each of the plurality of straps is affixed to the edge of the first or second support surface at two different attachment points to form a loop, and
each of the plurality of straps includes a hook at a midpoints thereof to attach to the bracket.

14. The seat according to claim 13, wherein each of the plurality of straps is elastic.

15. The seat according to claim 14, wherein each of the plurality of straps forms a V shape when attached to the bracket to contain baggage within the baggage storage device.

16. The seat according to claim 1, wherein the first and second support surfaces are substantially flat.

* * * * *